United States Patent [19]
Shenk et al.

[11] Patent Number: 5,676,019
[45] Date of Patent: Oct. 14, 1997

[54] NUT ASSEMBLY USING PARTIAL NUTS TO LIMIT HARMONIC ERROR

[75] Inventors: Edwin K. Shenk, Westford; Christopher P. Ricci, Braintree, both of Mass.

[73] Assignee: Polaroid Corporation, Cambridge, Mass.

[21] Appl. No.: 779,253

[22] Filed: Jan. 3, 1997

Related U.S. Application Data

[63] Continuation of Ser. No. 264,632, Jun. 23, 1994, abandoned.

[51] Int. Cl.$^6$ .................................................... F16H 1/20
[52] U.S. Cl. ........................ 74/424.8 A; 74/441; 74/841
[58] Field of Search ...................... 74/424.8 A, 441, 74/841

[56] References Cited

U.S. PATENT DOCUMENTS

| | | | |
|---|---|---|---|
| 3,831,460 | 8/1974 | Linley, Jr. | 74/441 |
| 3,977,269 | 8/1976 | Linley, Jr. | 74/441 |
| 4,274,294 | 6/1981 | Siryj et al. | 74/89.15 |
| 4,434,677 | 3/1984 | Linley, Jr. | 74/409 |
| 4,522,482 | 6/1985 | Pettigrew et al. | 355/3 R |
| 4,593,572 | 6/1986 | Linley, Jr. | 74/89.15 |
| 5,094,119 | 3/1992 | Virga et al. | 74/459 |
| 5,199,927 | 4/1993 | Rubin | 470/98 |
| 5,333,513 | 8/1994 | Blanding | 74/424.8 A |
| 5,392,662 | 2/1995 | Jadrich et al. | 74/89.5 |

FOREIGN PATENT DOCUMENTS

4307529A1  9/1994  Germany.

*Primary Examiner*—Rodney H. Bonck
*Assistant Examiner*—David M. Fenstermacher
*Attorney, Agent, or Firm*—Christopher P. Ricci; Joseph Stecewycz

[57] ABSTRACT

A nut assembly intended for use with a lead screw in precision movement devices for compensating for harmonic error from the lead screw by utilizing one or more partial nuts which are opposed along an axis of the lead screw such that the partial nuts ride the lead screw independently. An averaging apparatus is used to hold the partial nuts such that as the partial nuts follow the harmonic error, the error is averaged through the averaging apparatus to compensate for the harmonic error allowing the resulting motion of the nuts to be substantially linear.

21 Claims, 6 Drawing Sheets

NUT ASSEMBLY USING PARTIAL NUTS TO LIMIT HARMONIC ERROR

This is a continuation of application Ser. No. 08/264,632, filed Jun. 23, 1994 now abandoned.

BACKGROUND OF THE INVENTION

The present invention relates to fastening devices for use with screws and, more particularly, to nuts which are used with threaded lead screws in precision movement devices to limit harmonic error.

Precision movement devices often utilize lead screws to effectuate precise movement of a component coupled to the lead screw within the device. For example, a slow-scan printer uses a lead screw to drive a nut thereon linearly along a length of the lead screw. The nut is attached to and drives a carriage which supports a print head which, in turn, prints along a print surface, photographic film for example. Lead screws are generally metal rods having a helical cylindrical thread on which a nut, having a complimentary thread to that of the lead screw, is placed. As the lead screw rotates, the nut moves linearly along a length of the lead screw following the thread of the lead screw and also following any error introduced by the lead screw.

Errors arise when the lead screw is not placed in position perfectly or is not formed precisely. In the case of placement, the lead screw determines the path of travel of the print head and must be perfectly aligned parallel to the print surface. If this precise alignment is not obtained, a first order harmonic error is created, causing the print carriage to move toward and away from the print surface once per revolution of the lead screw. First order harmonic error can also result from manufacturing defects in the lead screw. Often the lead screw is made having a bend. Reworking to straighten the bend helps but usually a slight bend remains and creates first order harmonic error.

Common manufacturing techniques, including thread grinding and thread rolling, may also produce higher order harmonics to a lesser degree. Lapping the leadscrew, after the threads are formed, reduces these errors but some residual harmonic error remains.

Lead screws manufactured to tight tolerances often avoid the harmonic error problems caused by imprecision of construction but at a great cost. These lead screws are very expensive and negatively impact the cost of an end product.

If harmonic error is present in a precision movement device, such as the slow-scan printer or a scanner, the nut, and therefore the print head, will move with the harmonic error decreasing performance of the printer.

Prior art solutions such as that disclosed in U.S. Pat. No. 4,434,677 entitled "Antibacklash Spring Mounted Nut," by Francis M. Linley, Jr., issued Mar. 6, 1984, address problems such as backlash and self aligning of the nut but ignore the construction problems causing harmonic error.

Accordingly, it is an object of the invention to provide a nut for a lead screw which operates automatically to limit harmonic error from manufacturing imperfections in the lead screw.

It is another object of the invention to increase overall performance of the precision movement device by automatically compensating for manufacturing defects in lead screws which would otherwise cause harmonic errors.

It is yet another object of the invention to allow for use of lead screws manufactured to looser tolerances without affecting performance of the precision movement device.

It is a further object of the invention to reduce manufacturing costs of the precision movement device by automatically compensating for manufacturing defects in lead screws which would otherwise cause harmonic errors.

These and other objects of the invention will be obvious and will appear hereinafter.

SUMMARY OF THE INVENTION

The aforementioned and other objects are achieved by the invention which provides in one aspect a nut limiting harmonic error. The nut is useful with a variety of connectors too and is particularly useful on a lead screw within a precision movement device such as a slow scan printer or a scanner.

In a precision movement device, the nut rides on the lead screw to translate rotational motion of the lead screw to linear motion of the nut. As the lead screw rotates, threads on the lead screw, which are formed with a cylindrical helix structure about a central axis, rotate. The nut which has complimentary threads to the threads of the lead screw is driven by the rotational motion of the lead screw in a linear direction. The nut then drives any attached supporting structure such as a carriage assembly in the slow scan printer enabling a print head which resides on the carriage assembly to ride across a print surface creating an image on the print surface.

Harmonic error, such as first order drunkenness due to misalignment of the lead screw or thread formation on the lead screw, is also translated to linear motion and is reflected within the nut by periodic wobbling.

The invention utilizes one or more partial nuts which are adapted to move independently of each other. The one or more partial nuts have complimentary threads to the threads of the lead screw and are driven by the lead screw as previously described.

The one or more partial nuts are held in engagement with the lead screw by a compression means which applies a resilient compressive force radially inward against the one or more partial nuts such that the one or more partial nuts are biased into engagement with the threads of the lead screw.

As the harmonic error causes the one or more partial nuts to wobble, an averaging means connected to said one or more partial nuts averages the linear motion of the one or more partial nuts. The averaging means has pivot points ninety degrees of rotation from each of the partial nuts so as to move only by an average linear motion compensated for selected harmonic error.

The harmonic error to be compensated for is selected by choosing a rotational position for the one or more partial nuts. If the partial nuts are parallel to an axis of the supporting structure then the even harmonics will be compensated for. If the partial nuts are rotated by ninety degrees with respect to the axis of the supporting structure and transverse to a plane formed by the central axis and the axis of the supporting structure, the odd harmonics will be compensated for. And both of the previously described arrangements may be combined to compensate for both even and odd harmonic error by using, for example, four partial nuts each having a ninety degree rotation to another within the same plane.

In further aspects, the invention provides methods in accordance with the apparatus described above. The aforementioned and other aspects of the invention are evident in the drawings and in the description that follows.

BRIEF DESCRIPTION OF THE DRAWINGS

The foregoing and other objects of the invention, the various features thereof, as well as the invention itself can be more fully understood from the following description when read together with the accompanying drawings in which.

DETAILED DESCRIPTION

While the present invention retains utility within a wide variety of precision movement devices, and may be embodied in several different forms, it is advantageously employed in connection with a slow-scan printer. Though this is the form of the illustrated embodiment, and will be described as such, this embodiment should be considered illustrative and not restrictive.

Figure 1:
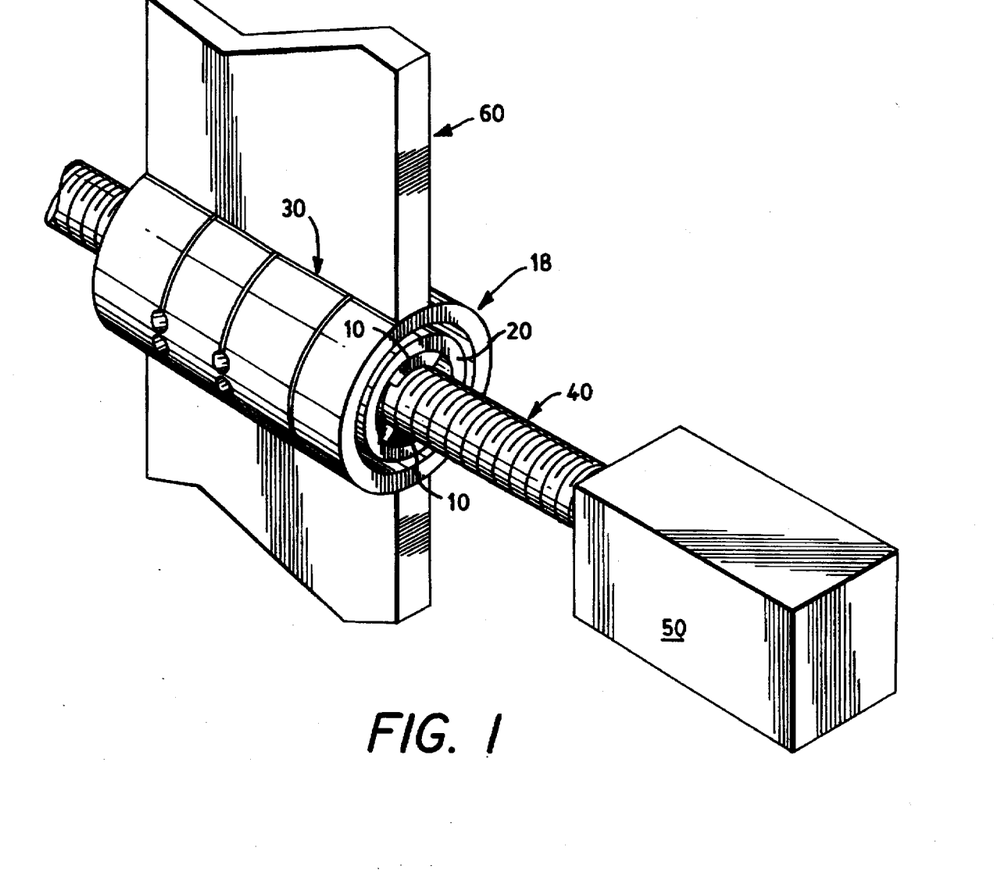
FIG. 1 shows a perspective view of the nut assembly in accordance with the invention on a lead screw as it would be used in a typical slow-scan printer.

FIG. 1 depicts a section of a slow-scan printer utilizing the invention. The Figure shows a motor 50 connected to a lead screw 40 for driving the lead screw to rotate. The lead screw 40 is threaded with a cylindrical helix structure to drive a nut assembly 18 which has a complimentary thread structure linearly due to the rotation of the lead screw 40. The nut assembly 18 is enclosed within a supporting structure, herein exemplified as a carriage assembly 60, which, in turn, carries a print head (not shown) for the printer. As the motor 50 rotates the lead screw 40, the nut assembly 18 is driven linearly causing the carriage assembly 60 to move with the nut assembly 18 across the print surface, photographic film for example, with precision movement.

Figure 2:
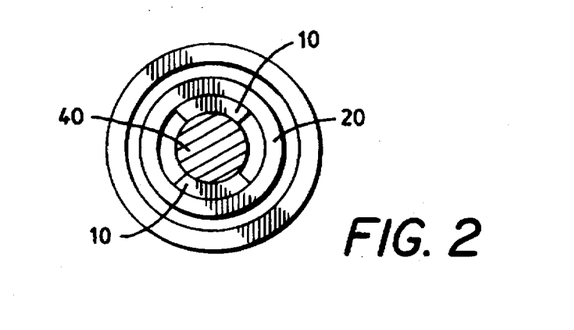
FIG. 2 shows a cross-sectional view of the nut assembly of FIG. 1.

Referring now to FIGS. 1–2, the partial nuts 10 in this embodiment are sized to maximize contact with the threads of the lead screw 40 and maximize ability to track harmonic error. To maximize contact with the threads, the size of the partial nuts 10 is increased such that there exists greater surface area and therefore more surface contact. To track the harmonic error of the lead screw 40, the partial nuts 10 cannot have too much thread contact or the harmonic error will not be able to move the partial nuts 10 against the force of the threads holding the partial nuts 10 in place. In the preferred embodiment, the partial nuts are cut to be approximately 45 degrees with respect to a central axis of the lead screw.

Figure 3:
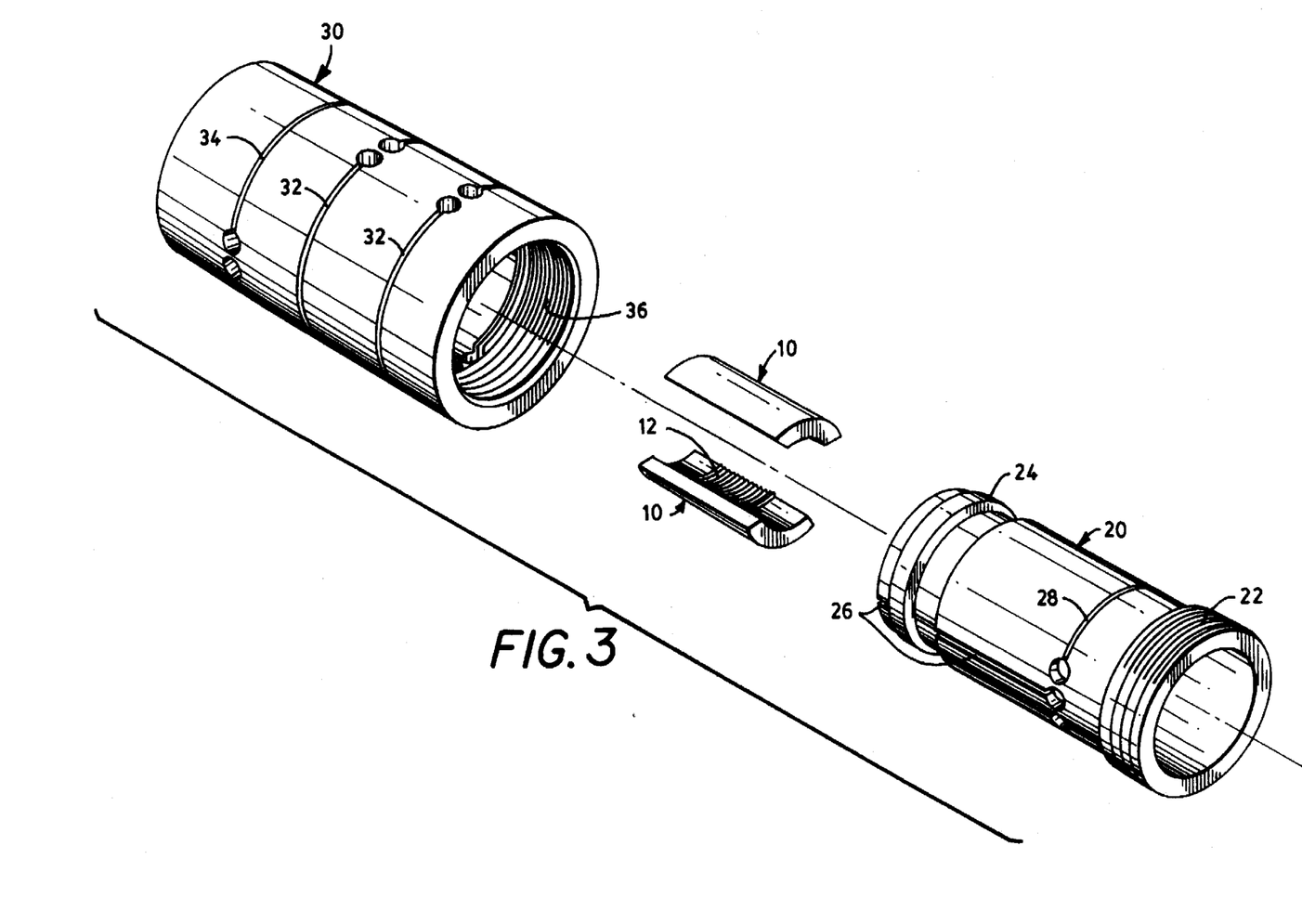
FIG. 3 shows an exploded view of the nut assembly of FIG. 1.

FIG. 3 shows the nut assembly 18 in exploded view illustrating more particularly a housing and the partial nuts 10. A housing for the partial nuts 10 is shown which is a flexible structure in an angular direction, but extremely stiff in a linear direction. In this embodiment, a two piece housing is used though numerous other structures are possible as long as they meet the aforementioned criteria.

The housing depicted in FIG. 3 consists of an inner housing 20 and an outer housing 30 which work together to provide the angular flexibility required by the invention. The inner housing 20 has male threads 22 which combine with a complimentary set of female threads 36 in the outer housing 30 such that the inner housing can be securely placed within the outer housing 30 to provide stiffness in the linear direction.

The inner housing 20 has two slots cut into it. The first slot is an axial slot 26 which passes through the structure of the inner housing 20 axially parallel to the central axis. Another axial slot (not shown) is radially opposed to the axial slot 26 allowing a top portion of the inner housing 20 and a bottom portion of the inner housing 20 to move up and down independently. When the partial nuts are secured within the inner housing 20 such that each of the two partial nuts 10 are diametrically opposed with one attached to the top portion and the other attached to the bottom portion, the partial nuts 10 are enabled to absorb slight errors in a radial direction.

A radial slot 28 bored along a circumference of the inner housing 20 allows a limited amount of motion in an angular direction again based on contact with the lead screw.

As previously stated, the two partial nuts 10 are attached to the interior of the inner housing 20. Each partial nut is placed within the inner housing 20 on opposite sides of the axial slot 26 and diametrically opposed to the other partial nut 10. Each partial nut 10 has a threaded surface 12 which is complimentary to the threads of the lead screw 40.

An elastic device 24 on the inner housing 20 provides an inward radial bias for biasing the two partial nuts 10 toward mechanical contact with the lead screw 40. In this embodiment the elastic device 24 is a rubber band which allows independent movement due to the axial slot 26 and allows the partial nuts to independently follow the harmonic and various errors that it may encounter.

The inner housing 20 is then placed within the outer housing 30. The outer housing has additional radial slots which allow further angular movement. An outer radial slot 34 acts in the same way as the inner radial slot 28 to allow angular movement between 270 degrees and 90 degrees relative to a central axis drawn through the axis of the lead screw 40. Two rotated radial slots 32 are shifted by 90 degrees in order to provide angular movement between 0 and 180 degrees relative to the central axis.

Figure 4:
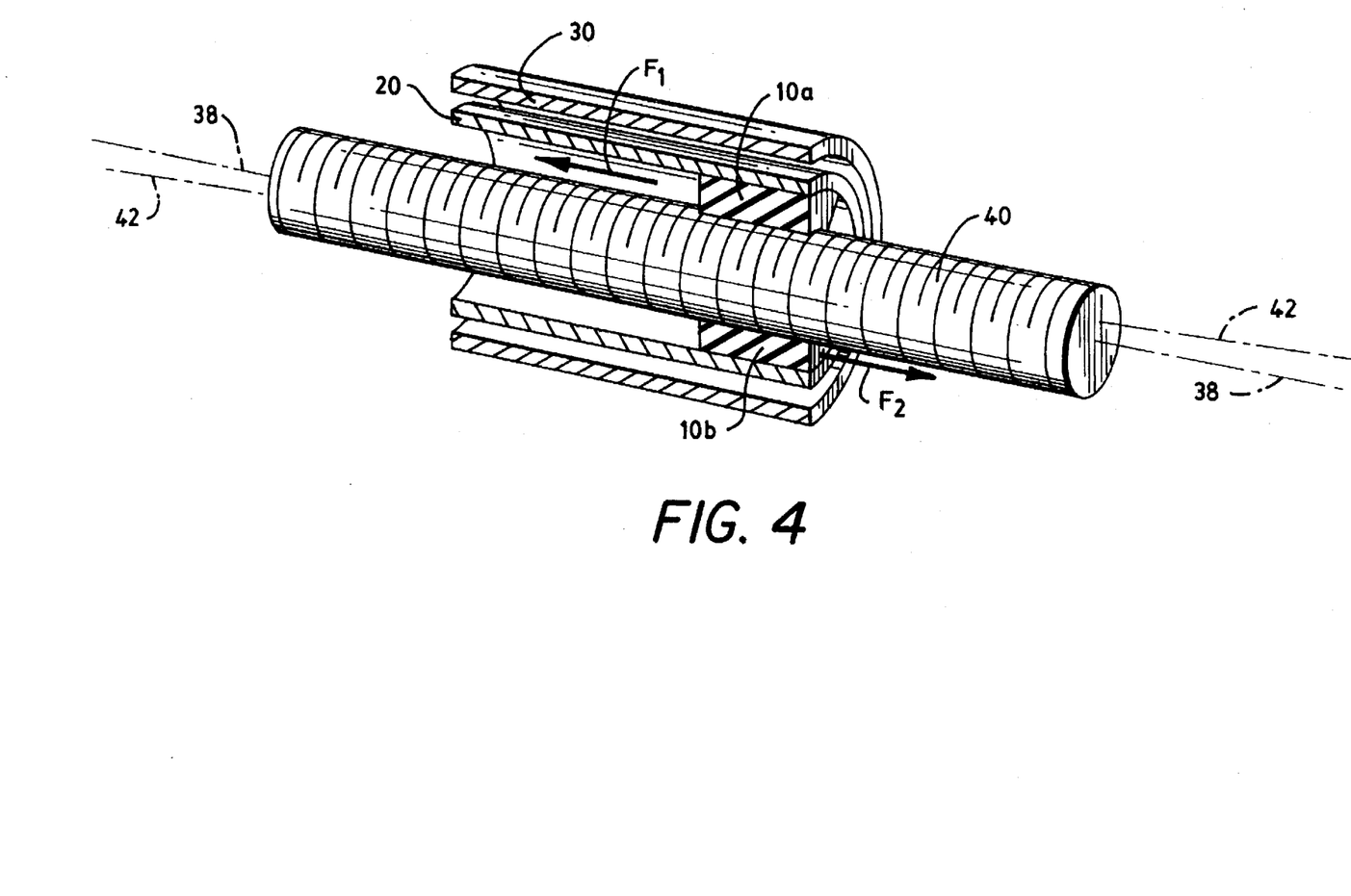
FIG. 4 shows a perspective view of the nut assembly of FIG. 1.

FIGS. 4 and 5 illustrate an example where the ends of the lead screw are misaligned. Descriptions accompanying the example will relate to application within a slow-scan printer but the example illustrated is applicable to numerous precision movement devices. Also, the example will assume that misalignment is the only harmonic error present within the system unless otherwise stated.

Misalignment of the lead screw 40, shown as having a misalignment axis 42, causes the lead screw 40 to incur a periodic error once per revolution, or a first harmonic error. This first harmonic error is also known as first order drunkenness in the art.

The first harmonic error causes the lead screw 40 to wobble which, in turn, is translated into linear motion by the nut assembly 18. Each partial nut 10 moves independently to follow the wobbling lead screw 40. As the lead screw 40 begins a rotation, the lead screw rises slightly with respect to the central axis 38. The rise of the lead screw 40 is translated by the top partial nut 10a into a backward linear motion $F_1$. At the same time, the bottom partial nut 10B translates the rise in the lead screw 40 into forward linear motion $F_2$. In other terms, this forward motion $F_2$ is equal in magnitude to the backward motion $F_1$ seen by the top partial nut 10a out of phase by 180 degrees.

Figure 5A:
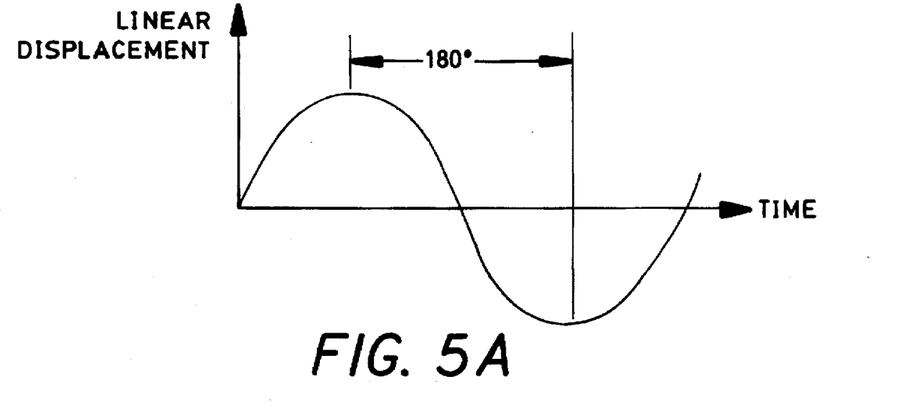
FIG. 5 is a series of plots indicating linear displacement of the nut versus time when subject to harmonic error.

FIG. 5A maps the motion top partial nut 10A in terms of linear displacement through one complete revolution the lead screw 40 relative to the central axis 38. The bottom partial nut 10B is the same wave form with a phase shift of 180 degrees. Therefore, when the top partial nut is at a peak, the lower partial nut is at a trough.

Since the partial nuts 10 are attached to the inner housing 20 and outer housing 30 and the housings 20, 30 are flexible in an angular direction due to the radial slots 28 and 34 (see FIG. 3), movement of the partial nuts in the aforementioned way is accommodated. As the top partial nut 10A moves backward, the top portion of the radial slots 28, 34 open, pivoting at diametrically opposed points 90 degrees on each side of the center of the top partial nut 10A.

At the same time, the bottom partial nut 10B is moving forward by an amount equal to the displacement of the top partial nut 10A. As the bottom partial nut 10B moves backward, the bottom portion of the radial slots 28, 34 close, pivoting at diametrically opposed points 90 degrees on each side of the center of the top partial nut 10A. These pivot points being the same as the pivot points for the top partial nut 10A allows the pivot points to reflect an average displacement seen by the two partial nuts 10. And since the housings 20, 30 are designed for linear stiffness, the nut assembly 18 will move linearly by an amount equal to the average movement of the partial nuts 10 as seen at the pivot points.

Looking again at FIG. 5A, it can be seen that the displacement seen by one partial nut is always equal in amplitude but opposite in sign from the displacement seen by the other partial nut. Therefore, the average, being the two displacements added together divided by the number of nuts, will always be zero divided by two, or zero, for the first harmonic thereby forcing the nut assembly to move linearly by an amount dictated by the rotation of the lead screw 40 minus contributions due to the first harmonic error.

Figure 5B:
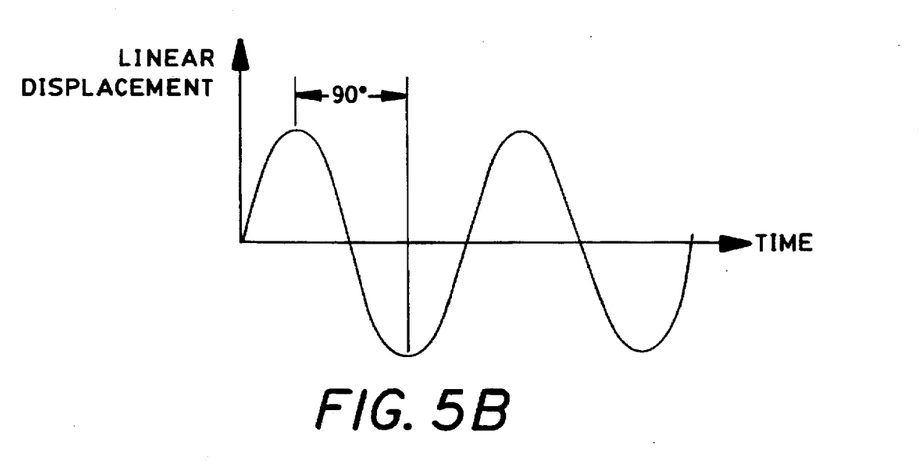

Expanding this example to include a second and third harmonic, due to, for example, ellipticity and the lead screw 40 being turned in a three-jaw chuck, it can be seen that any harmonic error that has a wave form which when shifted by 180 degrees causes a peak to overlay a trough of the original wave form, will be compensated by the two partial nut embodiment. More particularly, a second harmonic as shown in FIG. 5B when shifted by 180 degrees creates a wave form identical to that of the original wave form. Therefore, the two partial nut embodiment follows the second harmonic without compensating for it.

Figure 5C:
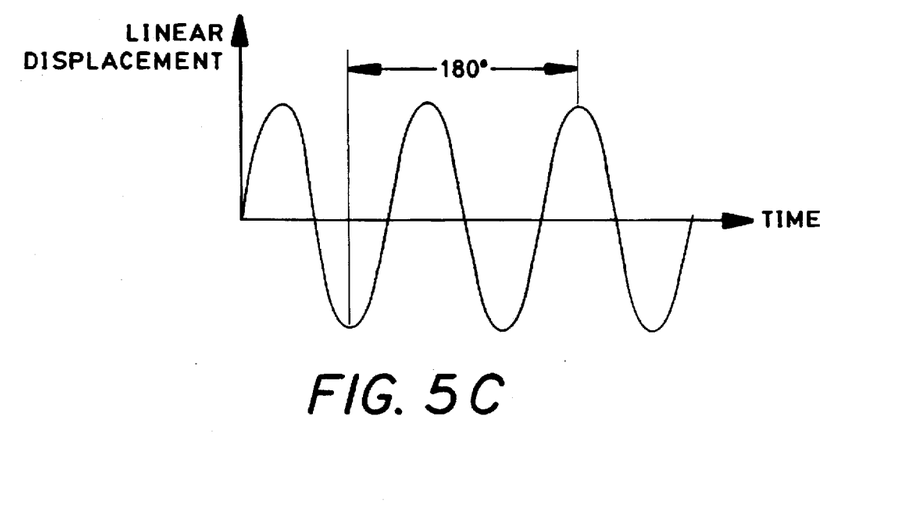

The third harmonic shown in FIG. 5C, on the other hand, when shifted by 180 degrees has the desired peak-trough relationship and is, therefore, automatically compensated for by the two partial nut embodiment. In fact, this is true for all odd harmonics.

Figure 6:
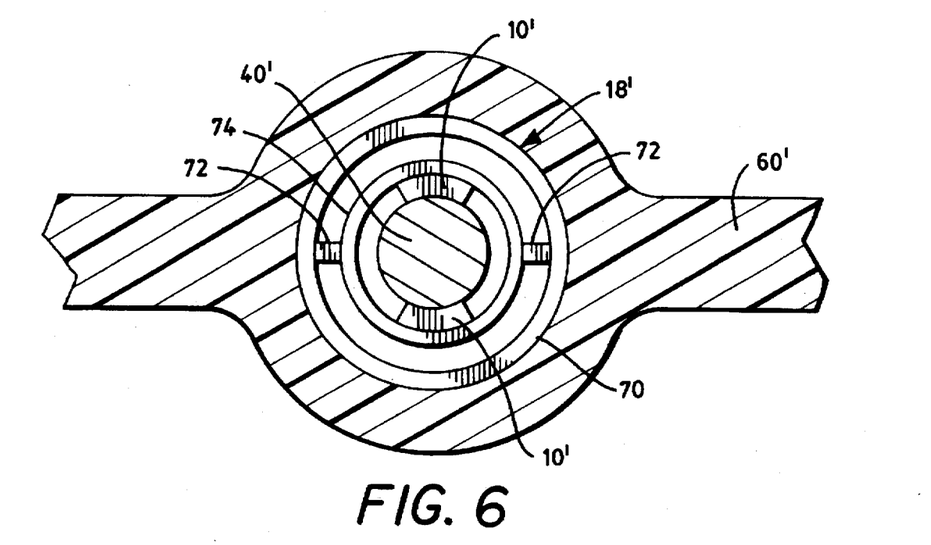
FIG. 6 shows a perspective view of a yoke-type embodiment having two partial nuts in accordance with the invention.

FIG. 6 depicts another embodiment of the invention using two partial nuts to compensate for error due to the odd harmonics. In this and subsequent illustrations, like parts will be shown with like numbers for consistency.

In this embodiment, the partial nuts 10' interact with the leadscrew 40' as previously described. The harmonic motion caused by harmonic error in the lead screw 40' causes the partial nuts 10' to move accordingly.

The partial nuts 10' are attached to an inner ring 74 which moves as the partial nuts 10' move.

The inner ring 74 is attached to a stationary outer ring 70 by pivot pins 72. The pivot pins 72 allow angular motion but are stiff in a linear direction such that angular movement of the inner ring 74 causes the inner ring 74 to pivot about the pivot pins 72. As before, the pivot pins reflect the average linear movement of the two partial nuts along the lead screw 40'. Therefore, the linear movement as driven by the lead screw 40' compensated by the odd harmonic error is seen by the pivot pin 72.

The pivot pins 72 used in the preferred embodiment can be replaced by other flexible members which allow angular motion while restricting linear motion. An example of such a structure was described in the two partial nut embodiment illustrated in FIGS. 1–4.

This linear motion then drives the outer ring 70 linearly along the central axis of the lead screw 40'.

To relate this embodiment back to the previous embodiment, a carriage assembly 60' is shown enclosing the nut assembly 18'. In a printer having such a carriage assembly 60', the carriage assembly is driven linearly along the central axis with the movement of the outer ring 70.

Figure 7:
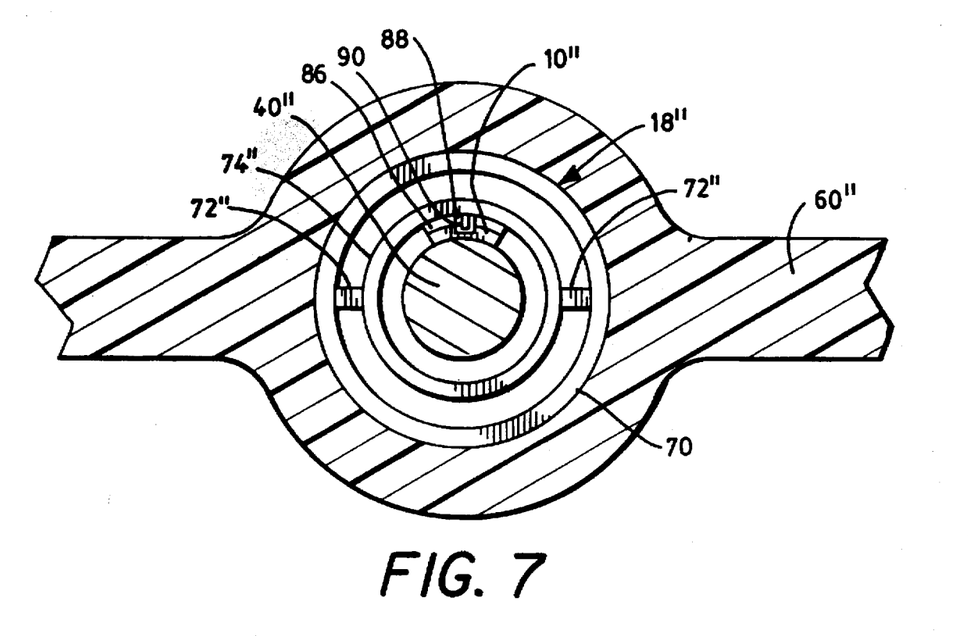
FIG. 7 shows a perspective view of an alternative embodiment to the yoke-type embodiment of FIG. 6 utilizing a single partial nut.

FIG. 7 illustrates an alternative embodiment of the gimbal-type structure shown in FIG. 6. This embodiment utilizes only one partial nut 10" where, instead of relying on the elastic device 24 to ensure mechanical contact with the lead screw, a compressive device, such as a spring, is used to bias the partial nut 10" into engagement with the lead screw.

In the preferred embodiment, the compressive device is a compressed rubber pad 86 which biases the partial nut 10" into contact with the lead screw 40". To ensure that the rubber pad 86 does not absorb linear movement, a pin extends from the inner ring 74" into a bore 88 in the partial nut 10". This allows radial movement along a length of the pin 90 thus ensuring that angular and linear movement are transmitted to the inner ring 74".

Figure 8:
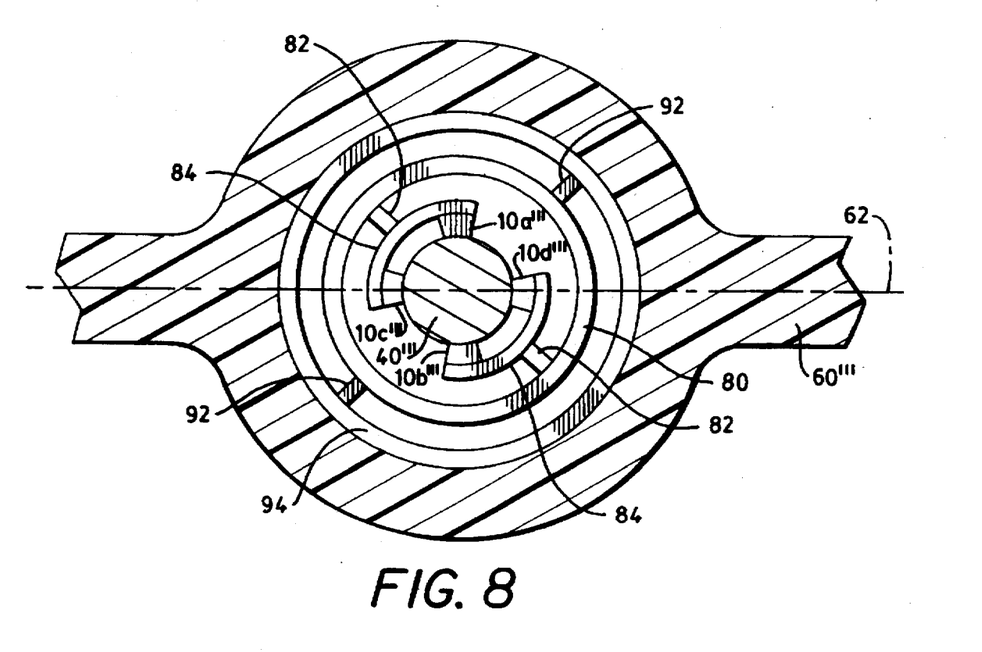
FIG. 8 shows a perspective view of a yoke-type embodiment having four partial nuts in accordance with the invention.

FIG. 8 shows an embodiment of the invention having four partial nuts 10a''', 10b''', 10c''', 10d'''. This structure utilizes two sets of opposed partial nuts to compensate for both even and odd harmonics as will be described hereinafter.

In much the same way as previously described, two partial nuts 10a''' and 10b''' are diametrically opposed perpendicular to an axis 62 of the carriage assembly 60'''. Since the top partial nut 10a''' is 180 degrees away from the bottom partial nut 10b''', the average of the two partial nuts 10a''', 10b''' compensates for odd harmonic error in much the same way as previously described.

Two additional partial nuts 10c''', 10d''' are included in this configuration which are diametrically opposed parallel to the axis 62 of the carriage assembly 60'''. The additional partial nuts 10c''', 10d''' are shifted 90 degrees from the other partial nuts 10a''', 10b'''. Looking again at FIG. 5B for a second order harmonic error, the 90 degree shift then translates to an overall phase change as seen by the partial nuts 10c''', 10d''' equal to 180 degrees minus 90 degrees. Since the total phase shift seen by the partial nuts 10c''', 10d''' is 90 degrees, the amount of linear displacement averaged between the partial nuts 10c''', 10d''' is between a peak and a trough for all even harmonics.

A set of two partial nuts 10a''', 10c''' are joined by an averaging bar 84. The averaging bar 84 pivots about a pivot pin 82 which allows independent motion of the two partial nuts 10a''', 10c''' thus moving only by an average of the amount dictated by the two partial nuts 10a', 10c'''.

Likewise, a second set of two partial nuts 10b''' and 10d''' are connected by a second averaging bar 84 which pivots about a second pivot pin 82.

The pivot pins 82 are joined to an inner ring 80 which is moved about a second set of pivot pins 92 which cause a stationary ring 94 to travel linearly by an amount dictated by the rotation of the lead screw 40''' compensated by the harmonic distortion, both odd harmonics and even harmonics.

An alternative to the embodiments thus far described is taking the yoke-type embodiments of FIGS. 6–8 and placing a selected one within the housing illustrated in FIGS. 1–4. This combination takes further advantage of housing to reduce binding while still efficiently compensating for selected harmonics.

The invention may be embodied in other specific forms without departing from the spirit or the essential characteristics thereof. The present embodiments are, therefore, to be considered in all respects as illustrative and not restrictive. The scope of the invention being indicated by the appended claims rather than by the foregoing description and all changes which come within the meaning and the range of equivalency of the claims are therefore intended to be embraced therein.

The embodiments of the invention in which an exclusive property or privilege is claimed are defined as follows:

1. A nut assembly for translating rotational motion of a lead screw, which has threads formed about a central axis, to substantially linear motion of a supporting structure while compensating for selected harmonic error associated with the lead screw, said nut assembly comprising:

one or more arcuate partial nuts in a spaced-apart arrangement about the central axis, each said partial nut having an arc length that minimizes thread contact while maintaining a grip on the lead screw, each said partial nut further having threads complimentary to the threads of the lead screw such that, when said one or more partial nuts are in engagement with the lead screw, the rotational motion of the lead screw is translated to motion of said one or more partial nuts along the central axis;

a nut housing enclosing said one or more partial nuts, said nut housing comprising at least two segments, each said segment aligned with the central axis such that an occurrence of the selected harmonic error causes at least one said segment to be angularly displaced relative to the central axis of the lead screw for averaging the motion of the one or more partial nuts along the central axis and compensating for the selected harmonic error so as to produce substantially linear motion; and means for connecting said nut housing with the supporting structure to transmit the substantially linear motion of said nut housing to the supporting structure.

2. The nut assembly according to claim 1 wherein said nut housing further comprises a gimbal structure comprising:

an inner ring having an annular structure and having a first radius in excess of an outer radius of the lead screw, said inner ring being adapted to hold said one or more partial nuts in engagement with said lead screw;

an outer ring having a second radius in excess of said first radius such that said inner ring is completely enclosed by said outer ring; and pivot means connecting said inner ring within said outer ring for allowing angular motion while restricting axial motion.

3. The nut assembly according to claim 1 wherein said one or more partial nuts comprise two partial nuts, each having said arc length less than one quarter of the circumference of the lead screw, and are opposed to each other perpendicular to the central axis.

4. The nut assembly according to claim 3 wherein said two partial nuts are opposed at a ninety degree rotation with respect to a plane formed by the central axis and the supporting structure to compensate for odd harmonics of the selected harmonic error.

5. The nut assembly according to claim 4 wherein said two partial nuts are opposed along a plane formed by the central axis and the supporting structure to compensate for even harmonics of the selected harmonic error.

6. The nut assembly according to claim 1 wherein said one or more partial nuts comprise four partial nuts, each separated by ninety degrees within a single plane, where a first set of two partial nuts are opposed perpendicular to the central axis and parallel to an axis of the supporting structure for compensating for even harmonic error in the lead screw and a second set of two partial nuts are opposed perpendicular to the central axis and perpendicular to the axis of the supporting structure for compensating for odd harmonic error in the lead screw.

7. The nut assembly according to claim 6 wherein said first set of two partial nuts and said second set of two partial nuts are connected by linking a first partial nut from the first set with a first partial nut from the second set and by linking a second partial nut from the first set with a second partial nut from the second set.

8. A nut assembly for translating rotational motion of a lead screw, which has threads formed about a central axis, to substantially linear motion of a supporting structure while compensating for selected harmonic error associated with the lead screw, said nut assembly comprising one or more partial nuts in a spaced arrangement about the central axis, and having complimentary threads to the threads of the lead screw such that, when in engagement with the lead screw, the rotational motion of the lead screw is translated to horizontal motion of the one or more partial nuts;

ring member having a rigid annular ring structure to enclose said one or more partial nuts around said lead screw;

connection means for securing said nut assembly to said supporting structure; and at least one flexible member connecting said ring member with the connection means, said at least one flexible member being adapted to allow angular motion while restricting axial motion between the ring member and the connection means, said at least one flexible member located relative to the one or more partial nuts such that horizontal motion of the one or more partial nuts is averaged by the at least one flexible member thereby propagating the substantially linear motion compensated for selected harmonic error to the supporting structure.

9. The nut assembly according to claim 8 wherein said one or more partial nuts comprise two partial nuts formed arcuately having an arc length that minimizes thread contact while maintaining a grip on the lead screw and are opposed to each other perpendicular to the central axis.

10. The nut assembly according to claim 9 wherein said two partial nuts are opposed at a ninety degree rotation with respect to a plane formed by the central axis and the supporting structure to compensate for odd harmonics of the selected harmonic error.

11. The nut assembly according to claim 9 wherein said two partial nuts are opposed along a plane formed by the central axis and the supporting structure to compensate for even harmonics of the selected harmonic error.

12. The nut assembly according to claim 8 wherein said one or more partial nuts comprises four partial nuts formed arcuately and having an arc length that minimizes thread contact while maintaining a grip on the lead screw, each separated by ninety degrees within a single plane, where a first set of two partial nuts are opposed perpendicular to the central axis and parallel to an axis of the supporting structure for compensating for even harmonic error in the lead screw and a second set of two partial nuts are opposed perpendicular to the central axis and perpendicular to the axis of the supporting structure for compensating for odd harmonic error in the lead screw.

13. The nut assembly according to claim 12 wherein said first set of two partial nuts and said second set of two partial nuts are connected by linking a first partial nut from the first set with a first partial nut from the second set and by linking a second partial nut from the first set with a second partial nut from the second set.

14. A nut assembly for compensating for harmonic error in a lead screw which has threads formed about a central axis, said nut assembly comprising one or more partial nuts adapted to move independently of each other in a spaced arrangement about the central axis, and having threads complimentary to the threads of the lead screw such that, when in engagement with the lead screw, the rotational motion of the lead screw is translated to motion of said one or more partial nuts along the central axis; and a nut housing enclosing said one or more partial nuts said nut housing having a gimbal structure to support the one or more partial nuts and to compensate for the selected harmonic error such that said nut housing moves along the central axis with a substantially uniform motion.

15. The nut assembly according to claim 14 wherein the one or more partial nuts are arrangable to compensate for substantially all of selected harmonics of the harmonic error.

16. The nut assembly according to claim 15 wherein the one or more partial nuts are opposed horizontally with respect to the gimbal structure to compensate for even harmonics of the harmonic error.

17. The nut assembly according to claim 15 wherein the one or more partial nuts are opposed vertically with respect to the gimbal structure to compensate for odd harmonics of the selected harmonic error.

18. The nut assembly according to claim 17 wherein said first set of two partial nuts and said second set of two partial nuts are connected by linking a first partial nut from the first set with a first partial nut from the second set and by linking a second partial nut from the first set with a second partial nut from the second set.

19. The nut assembly according to claim 14 wherein said gimbal structure comprises:

an inner ring having an annular structure and having a first radius in excess of an outer radius of the lead screw, said inner ring being adapted to hold said one or more partial nuts in engagement with said lead screw;

an outer ring having a second radius in excess of said first radius such that said inner ring is completely enclosed by said outer ring; and pivot means connecting said inner ring within said outer ring for allowing angular motion while restricting axial motion.

20. The nut assembly according to claim 14 wherein said one or more partial nuts comprise four partial nuts, each separated by ninety degrees within a single plane, where a first set of two partial nuts are opposed horizontally for compensating for even harmonic error in the lead screw and a second set of two partial nuts are opposed vertically for compensating for odd error in the lead screw.

21. The nut assembly according to claim 14 wherein said one or more partial nuts formed arcuately having an arc length that minimizes thread contact while maintaining a grip on the lead screw.

* * * * *